United States Patent [19]
Lancaster

[11] Patent Number: 5,849,645
[45] Date of Patent: Dec. 15, 1998

[54] REINFORCED COMPOSITE MATTING

[75] Inventor: Timothy L. Lancaster, Evansville, Tenn.

[73] Assignee: North American Green, Inc., Evansville, Ind.

[21] Appl. No.: 868,378

[22] Filed: Jun. 3, 1997

Related U.S. Application Data

[63] Continuation of Ser. No. 633,183, Apr. 23, 1996, abandoned, and Ser. No. 151,109, Nov. 12, 1993, abandoned.

[51] Int. Cl.$^6$ ....................................................... E02B 3/04
[52] U.S. Cl. .................................. 442/5; 442/13; 442/26; 428/116; 428/180; 428/183; 428/212; 405/15
[58] Field of Search ..................................... 442/26, 13, 5; 428/116, 180, 183, 212; 405/15

[56] References Cited

U.S. PATENT DOCUMENTS 5,651,641  7/1997  Stephens et al. ........................ 405/258

Primary Examiner—Richard Weisberger
Attorney, Agent, or Firm—Lundy and Associates

[57] ABSTRACT

A reinforced composite matting is disclosed, to provide a foundation for the development of vegetation to stabilize the channel surface, as a cost effective and environmentally friendly alternative to rip rap or concrete channel lining. The reinforced composite matting is formed of a bottom netting, a cuspated netting having ridges and troughs extending across the width of the cuspated netting, with the troughs substantially adacent to the bottom netting, and a top netting substantially adacent to the ridges of the cuspated netting. A fiber matrix, preferably of strands of coconut fibers is disbursed between the bottom netting and the cuspated netting, and the bottom netting, fiber matrix, cuspated netting and top netting are secured together, preferably with thread, to form the reinforced composite matting of this invention.

21 Claims, 4 Drawing Sheets

REINFORCED COMPOSITE MATTING

This is a continuation of application(s) Ser. No. 08/633,183 filed on Apr. 23, 1996 and Ser. No. 08/151,109 filed on Nov. 12, 1993, now abandoned.

TECHNICAL FIELD

The present invention is directed to reinforced composite matting, for environmental use in channel lining.

RELATED PRIOR ART

U.S. Pat. No. 2,092,183 discloses a system of wire formed into large structures on stream banks to help trap sediment and floating vegetal matter to cause accretion (build up) of the stream bank.

U.S. Pat. No. 3,517,514 discloses a soil protection mat formed of small tufts of fiber to provide sediment entrapment.

U.S. Pat. No. 4,002,034 discloses a non-woven fiber medium having different pore sizes and a top cover sheet with pressure reactive flaps to prevent erosion on revetments, while allowing the release of hydraulic pressure from beneath the soil face. This mat discloses a first layer of coconut fiber, but teaches away from applicant's invention, as this mat is not designed to collect sediment from the flowing water.

U.S. Pat. No. 4,159,360 discloses a fabric having a stabilized web.

U.S. Pat. No. 4,662,778 discloses a cuspated drainage mat.

Together, these patents represent the most relevant prior art known to applicant relating to environmental matting for use in channel lining.

DISCLOSURE OF THE INVENTION

This invention relates to a reinforced composite matting for use in channel lining. This reinforced composite matting may be used with seeded vegetation and for permanent reinforcement of mature vegetation. Without reinforcement, channel vegetation relies primarily upon the root system of each plant to bond to the channel surface.

Grass lined channels possessing root systems reinforced with synthetic mats are capable of withstanding more than two times the flow velocities and durations of un-reinforced grass linings. Thus, the present invention extends the use of vegetation lined channels into high discharge channels where only rip rap and concrete channels were previously specified.

Prior vegetal reinforcement systems required manual soil filling over the mat during installation, which often is impractical and expensive, and fails to provide adequate channel scour protection before and during vegetation establishment. Vegetation root systems cannot be reinforced if surrounding foundation soils are scoured away.

The reinforced composite matting disclosed herein, is installed directly on the channel surface with no additional soil filling, and works in conjunction with natural processes to facilitate Phase One, pre-vegetation protection (0–6 months); Phase Two, vegetation establishment (6–24 months); and Phase Three, mature vegetation (24+ months) protection.

During Phase One, the flexible, reinforced composite matting is installed and secured in the channel with suitable staples. The reinforced composite matting stabilizes the channel surface and provides a solid foundation for the development of a stable channel. The fiber matrix quickly fills with sediment from runoff passing through the channel, which encourages seed germination and the establishment of root systems.

During Phase Two, a layer of sediment and thatch blanket the reinforced composite matting, and vegetation spreads across the surface, with roots penetrating through the matting into the channel soil. Without the composite matting, soil around the developing vegetation in the channel is exposed to being washed away, and combined with pre-existing soil erosion problems, endanger the vegetal lining of the channel.

Phase Three provides mature vegetation upon the reinforced composite matting, which reinforces the vegetal lining system, and consolidates overlaying soil, roots and subsoil into a unified mat. The dense matrix thus formed, anchors plant roots to the surrounding soils, keeping individual plants from being dislodged from the channel surface under high shear stress flows.

The reinforced composite matting and the mature vegetal lining provide permanent stabilization for the channel for the remainder of the channel life, providing a cost effective and environmentally friendly alternative to rip rap or concrete channel lining.

The reinforced composite matting comprises a heavy weight bottom netting, a super heavy weight cuspated netting having alternating ridges and troughs extending in substantially parallel relation across the width of the cuspated netting, and a heavy weight top netting.

Sandwiched between the bottom netting and the cuspated netting is a fiber matrix, formed of elongated strands commercially available fibers, such as of coconut fibers or recycled nylon fibers. The bottom netting, the fiber matrix, the cuspated netting and the top netting are preferably secured together by stitching strands of thread in spaced relation tangent to the plurality of ridges and troughs formed in the cuspated netting.

Other known means of securing the bottom netting, the fiber matrix, the cuspated netting and the top netting together may be used without departing from this disclosure, or from the scope of the following claims.

The bottom netting, the cuspated netting and the top netting are each preferably formed of ultra-violet stabilized plastic materials. The bottom netting, the top netting and the cuspated netting each preferably form a grid of apertures, with each aperture having a substantially uniform spacing selected from one-sixteenth inch to two inches in length and from one-sixteenth inch to two inches in width. The grids are preferably formed of substantially rectangular apertures. Other aperture shapes, such as diamond apertures, also form a part of this invention.

The above mentioned and other features and objects of this invention and the manner of attaining them will become more apparent and the invention itself will be best understood by reference to the following description of an embodiment of the invention, when considered in conjunction with the accompanying drawings.

BEST MORE FOR CARRYING OUT THE INVENTION

Figures 1A, 1B:
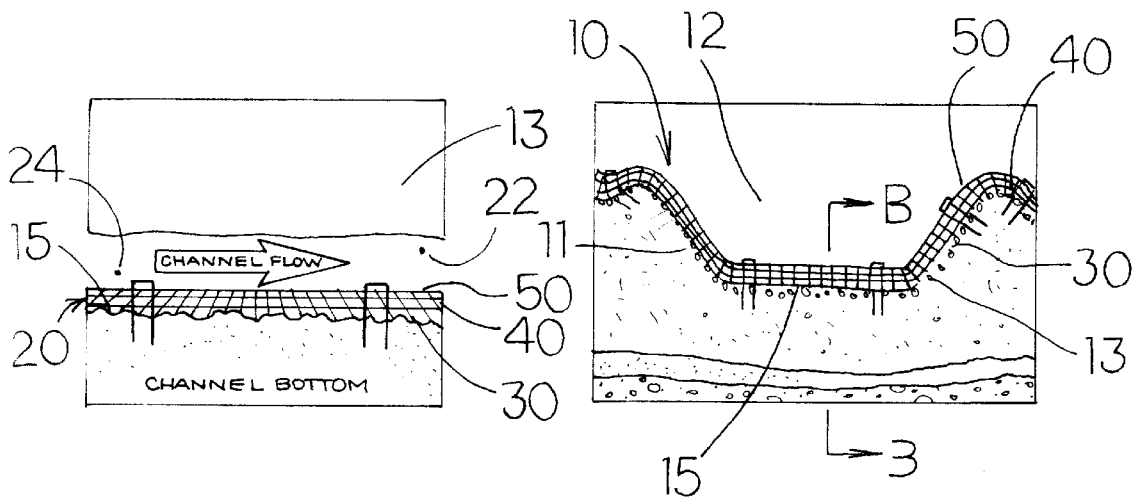
FIG. 1A is a cross-sectional view of the reinforced composite matting positioned in a channel to provide environmental erosion protection to the channel during Phase One channel growth.
FIG. 1B is a cross-sectional view taken along lines B—B in FIG. 1A, showing the direction of channel flow during Phase One channel growth.

The subject matter regarded as our invention is particularly pointed out and distinctly claimed in the claims. The structure and operation of this invention, together with further objects and advantages, may be better understood from the following description given in connection with the accompanying drawings, in which:

FIG. 1A is a cross-sectional view of the reinforced composite matting 10 of this invention, installed in a channel 12 to cover the channel sides 11, 13 and bottom 15, during Phase One, Pre-Vegetation channel growth. The reinforced composite matting 10 prevents excess erosion of channel soil 14 and seed 16, while providing a fiber matrix 20 to trap mulch 22 and sediment 24 to provide a growing medium 26 to promote plant 18 vegetation establishment.

FIG. 1B is a cross-sectional view taken along lines B—B in FIG. 1A, showing the preferred direction of channel flow, with the reinforced composite matting 10 installed on the channel bottom 15, during Phase One channel growth.

Figures 2A, 2B:
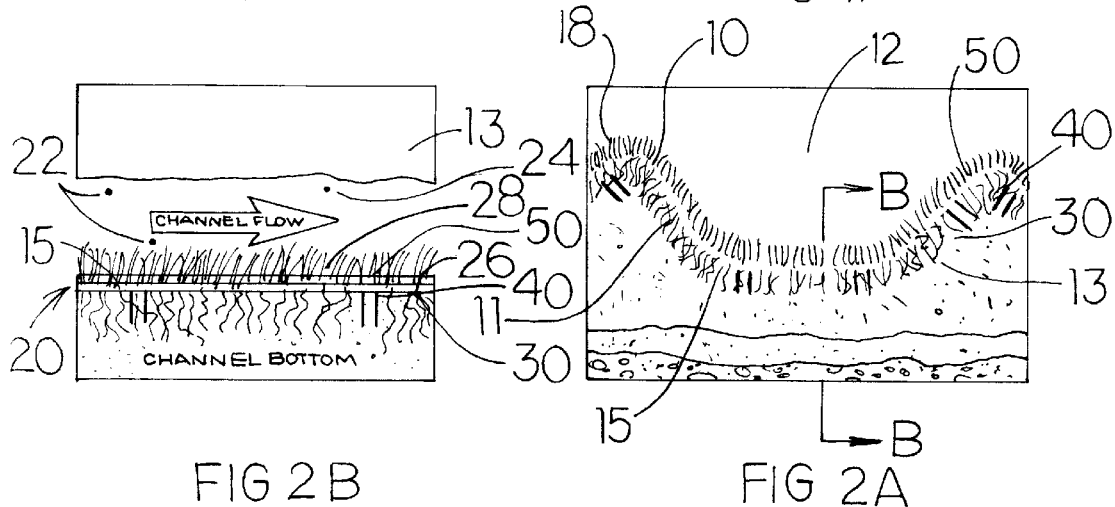
FIG. 2A is a cross-sectional view of the reinforced composite matting positioned in a channel during Phase Two channel growth.
FIG. 2B is a cross-sectional view taken along lines B—B in FIG. 2A, showing the direction of channel flow during Phase Two channel growth.

FIG. 2A is a cross-sectional view of the reinforced composite matting 10 of this invention, installed in a channel 12 to cover the channel sides 11, 13 and bottom, during Phase Two: Vegetation Establishment channel growth. The reinforced composite matting 10 provides an environment wherein vegetation 18 emerges and propagates over the channel 12 surface. The reinforced composite matting 10 prevents excess erosion around new seedling plants 18, and in areas of sparse grass or other plant 18 growth. The reinforced composite matting 10 traps mulch 22, sediment 22 and plant litter 28, helping to build a growing medium 24 for future generations of plants 18.

FIG. 2B is a cross-sectional view taken along lines B—B in FIG. 2, showing the preferred direction of channel flow, with the reinforced composite matting shown installed upon the channel bottom 15 during Phase Two channel growth.

Figures 3A, 3B:
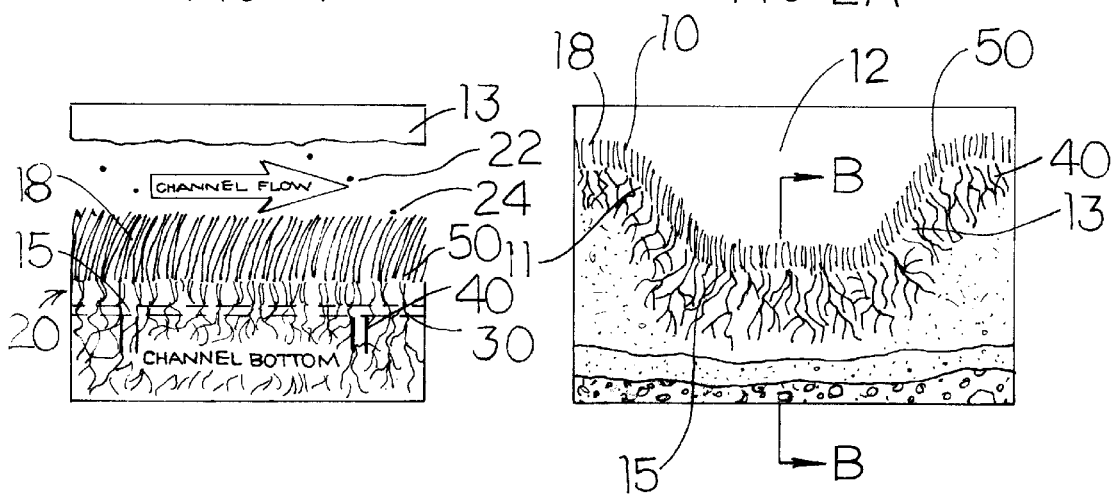
FIG. 3A is a cross-sectional view of the reinforced composite matting positioned in a channel during Phase Three channel growth.
FIG. 3B is a cross-sectional view taken along lines B—B in FIG. 2A, showing the direction of channel flow during Phase Three channel growth.

FIG. 3A is a cross-sectional view of the reinforced composite matting 10 of this invention installed upon the sides 11, 13 and bottom 15 of a channel 12, during Phase Three: Mature Vegetation channel growth. During Phase Three, vegetation 18 thrives on the channel 12 surface. The bottom netting 30, cuspated netting 40, and top netting 50 are buried beneath grass or other vegetation 18 stands and entrapped sediment 24 and plant litter 28, providing reinforcement for plant 18 root systems and eliminating plant 18 extraction during high velocity channel 12 flow.

FIG. 3B is a cross sectional view taken along lines B—B in FIG. 2A, showing the preferred direction of channel flow, with the reinforced composite matting shown installed upon the channel bottom 15 during Phase Three channel growth.

Figure 4:
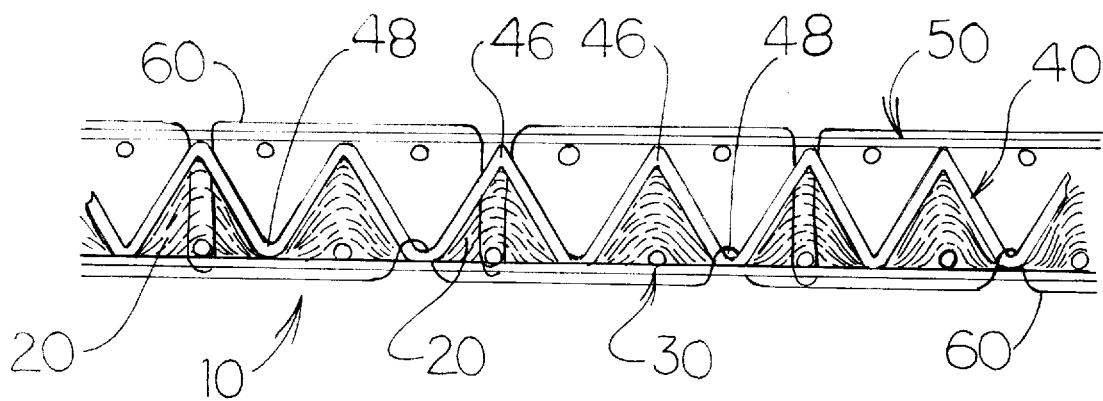
FIG. 4 is a cross sectional view of the reinforced composite matting showing the bottom netting, the fiber matrix, the cuspated netting and the top netting secured together, forming the reinforced composite matting disclosed herein.

As best shown in FIG. 4, the reinforced composite matting comprises a heavy weight bottom netting 30, a fiber matrix 20, preferably comprising a plurality of strands of coconut fibers, a super heavy weight cuspated netting 40, and a heavy weight top netting 50. The bottom netting 30, cuspated netting 40 and top netting 50 are each preferably formed of ultra-violet (UV) stabilized plastic material, to ensure long life and utility in its intended environment.

Figure 5A:
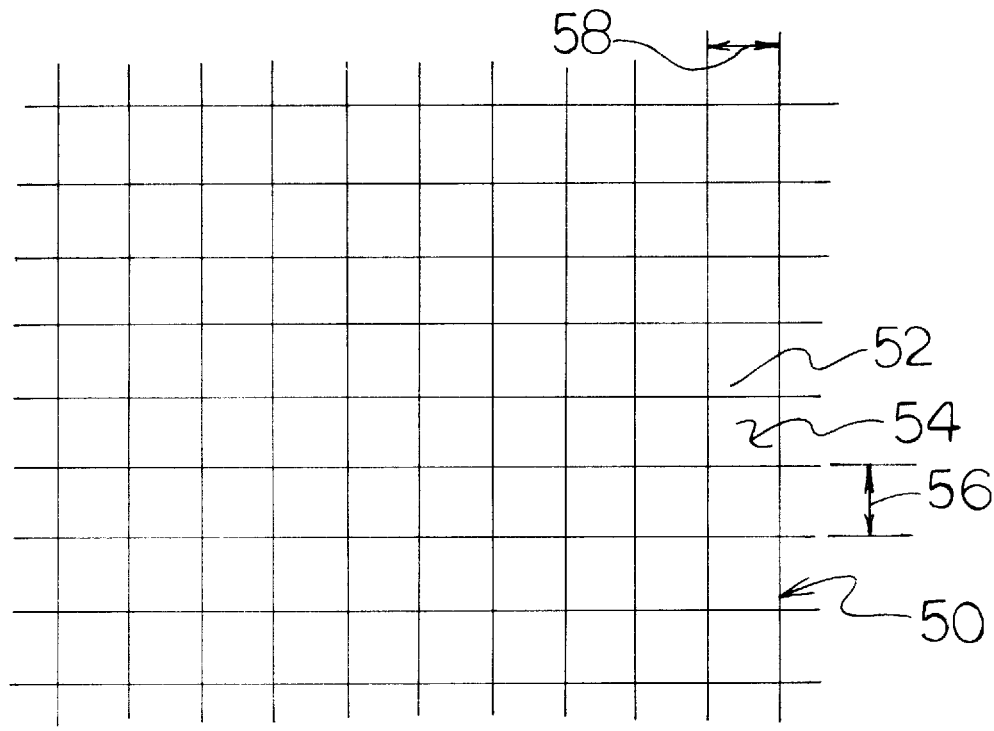
FIG. 5A is a plan view of a section of the top and bottom netting, showing substantially rectangular apertures.

As best shown in FIG. 5A, the top netting 50 and bottom netting, 30 are preferably formed of a heavy weight UV stabilized grid of plastic netting forming a plurality of apertures 34 therebetween. The heavy weight top netting 50 and bottom netting 30 are each preferably three pounds per 1000 square feet approximate weight.

Figure 5B:
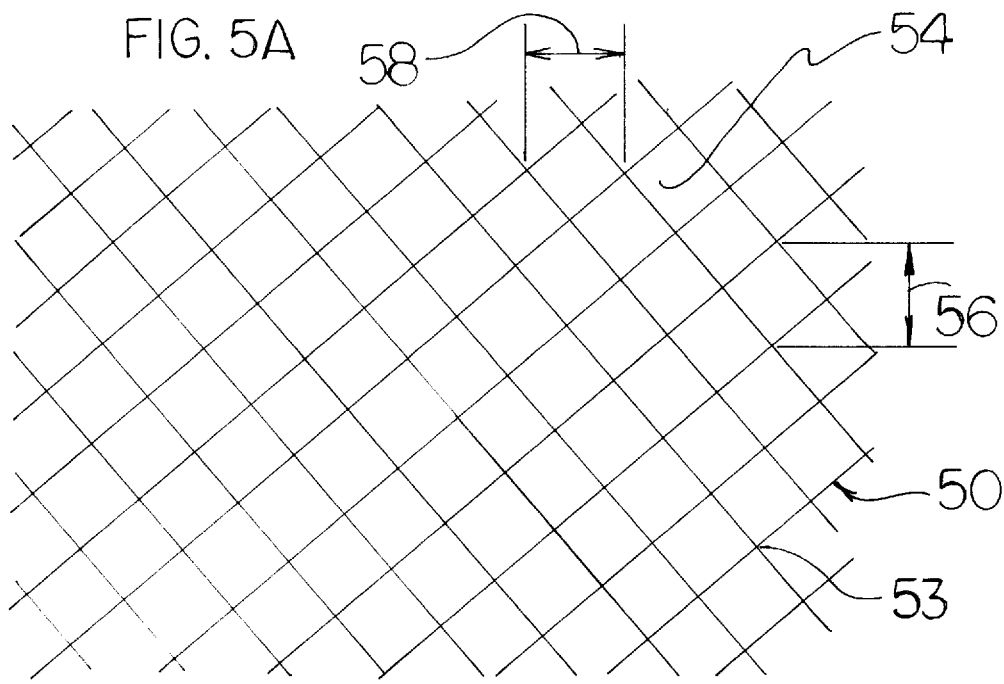
FIG. 5B is a plan view of a section of the top and bottom netting, showing substantially diamond shaped apertures.
Figure 7:
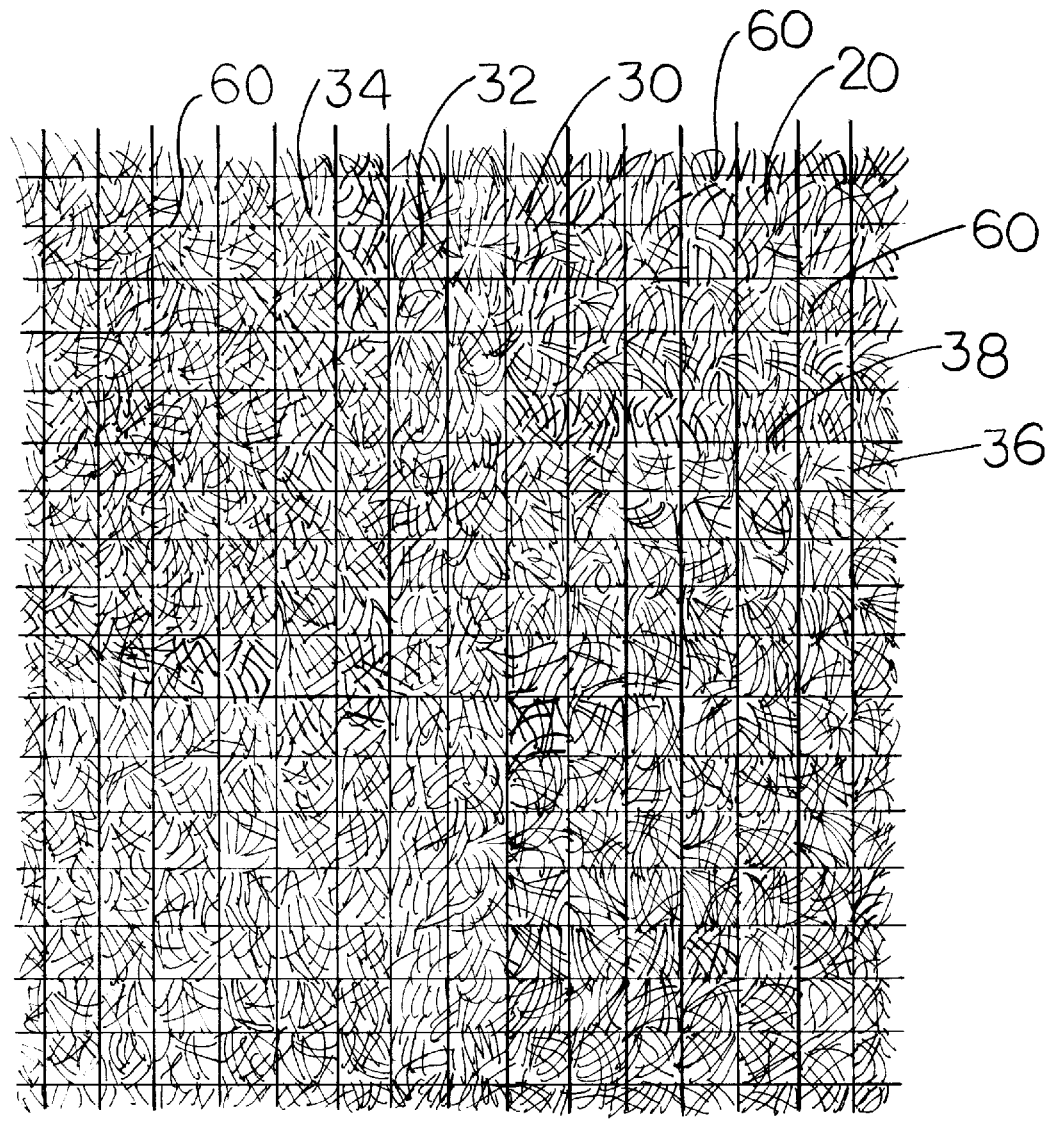
FIG. 7 is a bottom view showing the bottom netting, the fiber matrix, and the thread used to secure the reinforced composite matting together.

The apertures 34 preferably are of a substantially rectangular configuration, having a substantially uniform spacing selected from one-sixteenth inch to two inches in length 36, and from one-sixteenth inch to two inches in width 38. While substantially rectangular apertures 34 are shown in FIG. 5A, other aperture shapes, such as diamond apertures 34, are shown in FIG. 5B, and are intended to fall within the scope of this disclosure and the following claims.

Figure 6:
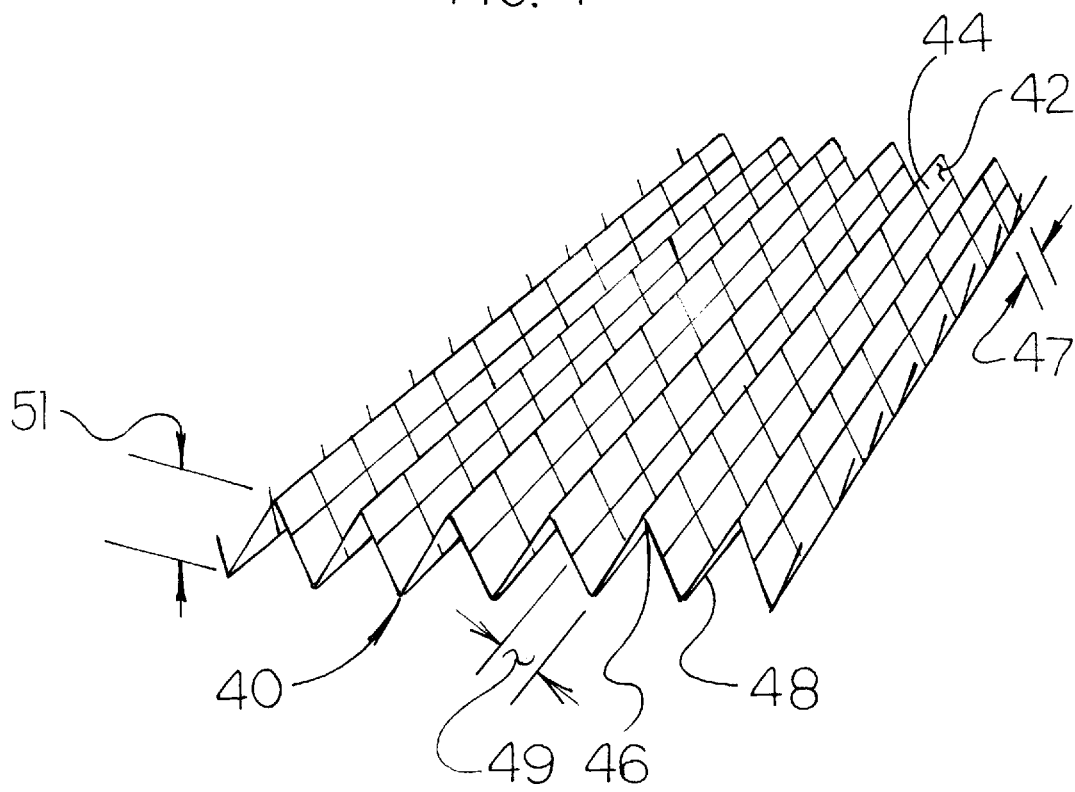
FIG. 6 is a perspective view of a section of the cuspated netting, showing the pleated ridges and troughs extending substantially parallel across the width of the cuspated netting.

As best shown in FIG. 6, the cuspated netting 40 is formed of a super heavy weight UV stabilized grid of plastic forming a plurality of apertures 44 therebetween. The cuspated netting 40 is preferably five pounds per 1000 square feet approximate weight. The apertures 44 preferably are of a substantially rectangular configuration having a substantially uniform spacing selected from one-sixteenth inch to two inches in length 43, and from one-sixteenth inch to two inches in width 45. Alternately, other aperture shapes 34, such as the diamond apertures shown in FIG. 5B may also be used to form the cuspated netting 40 grid.

As best shown in FIG. 4 and 6, the cuspated netting 40 is pleated with a plurality of alternating ridges 46 and troughs 48 extending in substantially parallel relation across the width 47 the cuspated netting 40. The ridges 46 and troughs 48 are of a substantially uniform height 41, selected from one-eighth inch to one inch in height, forming a three-dimensional cuspated netting 40 grid which serves to add strength and stability to the reinforced composite matting 10.

The cuspated netting 40 serves to provide a protected region for trapping mulch 22, sediment 24 and plant litter 28, and protecting seeds 16 during Phase one Plant Growth. The three-dimensional cuspated netting 40 grid further provides an ideal growing medium 26 for sprouting plants 18 during Phase Two Plant growth, and for supporting second and third generation stands of vegetation 18 during Phase Three Plant growth.

As best shown in FIG. 5A, the top netting 50 is preferably formed of heavy weight grid 52 of plastic forming a plurality of apertures 54. The apertures 54 preferably are of a substantially rectangular configuration, having a substantially uniform spacing length 56 selected from one-sixteenth inch to two inches, and a substantially uniform spacing width 58 selected from one-sixteenth inch to two inches.

While the apertures 34 in the bottom netting 30, the apertures 44 in the cuspated netting 40, and the apertures 54 in the top netting 50 are preferably form a substantially rectangular grid 52, it is within the scope of this invention to include other known aperture configurations, such as those used in the manufacture of netting apparatus, and such other known aperture configurations are intended to fall within the scope of the following claims.

Referring once again to FIG. 4, the fiber matrix 20 is secured between the bottom netting 30, and the troughs 48 formed in the cuspated netting 40. The top netting 50 is secured adjacent to the ridges 46 of the cuspated netting, to add additional strength and stability to the composite matting 10 The fiber matrix 20 substantially fills the space between the bottom netting 30 and the cuspated netting 40, forming ridges 27 and grooves 29 in the fiber matrix 20 which generally conform to the ridges 46 and grooves 48 of the cuspated netting 40.

The bottom netting 30, the fiber matrix 20, the cuspated netting 40 and the top netting 50 are preferably secured together by stitching strands of 60 to 100 per cent polyester black thread in spaced relation tangent to the plurality of ridges 46 and troughs 48 formed in the cuspated netting 40. The threaded strands 60 secure portions of the top netting 50 to adjacent portions of the ridges 46 on the cuspated netting 40. The threaded strands 60 further secure portions of the bottom netting 30 to adjacent portions of the troughs 48 formed in the cuspated netting 40, thereby sandwiching and trapping the fiber matrix materials 20 therebetween.

Any known means of securing the bottom netting, the fiber matrix, the cuspated netting and the top netting together may be used, such as gluing, thermal bonding, mechanical fasteners, etc. to ensure the reinforced composite matting 10 stays together during storage, installation and prolonged use in its intended environment.

The reinforced composite matting 10 disclosed herein, is intended for use in lining channels 12 having an intermittent water flow, during all three phases of channel growth.

The bottom netting 30 provides structural support and retention for the fiber matrix 20 and serves to reduce fiber loss during high velocity channel 20 water flow.

The fiber matrix 20 provides temporary to long term scour protection and mulch 22 entrapment, to protect seeds 16 during Channel Phase One growth, as best shown in FIG. 1A and 1B. The fiber matrix 20 also provides a protective environment to promote vegetation 18 establishment on the channel 12 surface during Channel Phase Two growth, best shown in FIG. 2A and 2B.

The 40 ridges 46 and troughs 48 of the cuspated netting 40 retain the fiber matrix 20 between the bottom netting 30 and the cuspated netting 40 to trap sediment and form a permanent vegetal root reinforcement medium during Channel Phase Three growth, best shown in FIG. 3A and 3B.

The cuspated netting 40 forms a series of ridges 46 and troughs 48 across the transverse direction (width) 45 of the matting 40, perpendicular to the expected channel 12 flow, which serves to better trap sediment 24 and thatch, thus expediting the natural soil 14 filling and root reinforcement of plants 18 and vegetation on the channel 12 surface. See FIG. 1B, 2B and 3B.

The height 41 of the cuspated netting 40 serves to strengthen the reinforced composite matting 10, while forming a permanent vegetal 18 root reinforcement medium in the ridges 46 and troughs 48 thus formed.

The top netting 50 structurally supports the underlying cuspated netting 40 to reduce stretching and flattening of the ridges 46 and troughs 48 during installation and prolonged use in its intended environment of channel 12 lining. The top netting 50 bridges over troughs 48 and ridges 46 of the cuspated netting 40 to trap sediment 24 and plant litter 28 therebetween. The top netting 50 acts to reduce the washing away of mulch 22 and soil from the troughs 48, and provides permanent vegetal 18 root reinforcement to provide an improved environment for channel 12 lining during all three phases of channel growth.

The ridges 46 and troughs 48 of the cuspated netting 40 are intended for installation in the channel flow tangent to the intended direction of channel flow. See FIG. 1B, 2B and 3B. This helps to trap sediment 24 between the ridges 46 and troughs 48 of the cuspated netting 40, and reduces the washing away of the trapped sediment 24 during high velocity channel 12 flow.

Seeds 16 may be inserted into the fiber matrix 20 prior to installing the reinforced composite matting 10 along the channel 12 surface, in preparation for Channel Phase One growth.

INDUSTRIAL APPLICABILITY

This invention is intended for use in environmental soil erosion control, particularly for use in channel lining having intermittent channel flow.

CONCLUSION

Although the present invention has been illustrated and described in connection with an example embodiment, it will be understood that this specification is illustrative of the invention, and is by no means restrictive thereof. It is reasonably expected that those skilled in the art can make numerous revisions and additions to the invention and it is intended that such revisions and additions will be included within the scope of the following claims as equivalents of the invention.

What is claimed is:

1. A reinforced composite matting for channel lining, comprising a fiber matrix held in place by a net reinforcement, said reinforcement having a bottom netting and a cuspated netting, said cuspated netting being three dimensional and defining the top and bottom of said matting, said fiber matrix being formed of a plurality of randomly oriented fibers, said fiber matrix being sandwiched between said bottom netting and said cuspated netting, said bottom netting being secured in spaced array through said fiber matrix to said cuspated netting.

2. The reinforced composite matting of claim 1, wherein said bottom netting comprises a grid defining a plurality of substantially rectangular apertures, each aperture having a substantially uniform spacing selected from one-sixteenth inch to two inches in length and from one-sixteenth inch to two inches in width.

3. The composite matting of claim 1, wherein said cuspated netting comprises a grid defining a plurality of substantially rectangular apertures, each aperture having a substantially uniform spacing selected from one-sixteenth inch to two inches in length and from one-sixteenth inch to two inches in width.

4. The composite matting of claim 1, further comprising a top netting secured in spaced array to said cuspated netting adjacent to said ridges thereof, said top netting having a grid defining a plurality of substantially rectangular apertures, each aperture having a substantially uniform spacing selected from one-sixteenth inch to two inches in length and from one-sixteenth inch to two inches in width.

5. The composite matting of claim 1, wherein said bottom netting is formed of an ultra-violet stabilized plastic material.

6. The composite matting of claim 1, wherein said cuspated netting is formed of an ultra-violet stabilized plastic material.

7. The composite matting of claim 1, wherein said top netting is formed of an ultra-violet stabilized plastic material.

8. The composite matting of claim 1, wherein said bottom netting is secured to cuspated netting by stitching polyester black thread through said bottom netting and cuspated netting in spaced relation perpendicularly to said ridges and troughs of said cuspated netting.

9. The composite matting of claim 1, wherein said top netting is secured to the cuspated netting by stitching polyester black thread through the top netting and the cuspated netting in spaced relation tangent to the plurality of ridges and troughs formed in the cuspated netting.

10. The composite matting of claim 1, wherein said bottom netting, the fiber matrix, the cuspated netting and the top netting are all secured together by stitching polyester thread in spaced relation tangent to the plurality of ridges and troughs formed in the cuspated netting.

11. The composite matting of claim 1, wherein said fiber matrix comprises a plurality of elongated strands of coconut fibers.

12. The composite matting of claim 1, wherein said bottom netting each comprise grids formed of a plurality of substantially diamond shaped apertures.

13. The composite matting of claim 1, wherein said ridges and troughs formed in the cuspated netting are selectively sized to extend from one-eighth inch to one inch in height between the top and bottom netting.

14. The composite matting of claim 1 further comprising a top netting, said top netting secured in spaced array adjacent to the ridges of the cuspated netting, said cuspated netting being between top and bottom netting.

15. The composite matting of claim 1, wherein said bottom netting, cuspated netting and top netting are each formed of ultra-violet stabilized plastic materials.

16. The composite matting of claim 1 wherein said cuspated netting has a plurality of alternating ridges and troughs extending in substantially parallel relation, said bottom netting being secured to said troughs of said cuspated netting.

17. The composite matting of claim 1, wherein said bottom netting, fiber matrix, and cuspated netting are all secured together by stitching thread in spaced relation substantially tangent to the plurality of ridges and troughs formed in the cuspated netting.

18. The composite matting of claim 17, wherein said bottom netting, the fiber matrix, the cuspated netting and the top netting are all secured together by stitching thread in spaced relation substantially tangent to the plurality of ridges and troughs formed in the cuspated netting.

19. The composite matting of claim 17, wherein said ridges and troughs of the cuspated matting are intended for installation substantially tangent to the intended direction of channel flow.

20. A reinforced composite matting for channel lining, comprising a fiber matrix held in place by a net reinforcement, said reinforcement having a bottom netting defining a grid of apertures, a cuspated netting defining a grid of apertures, said cuspated netting apertures having a plurality of alternating ridges and troughs extending in substantially parallel relation, said fiber matrix being sandwiched between said bottom netting and said cuspated netting, said bottom netting being secured in spaced array through the fiber matrix in close proximity to said troughs to said cuspated netting, and a top netting defining a grid of apertures, said top netting being secured in spaced array to said ridges of said cuspated netting.

21. A three phase reinforced composite matting which traps sediment, mulch, leaves and thatch to expedite natural soil in-filling and plant root entanglement for improved erosion control as a channel lining, comprising a fiber matrix formed of a plurality of randomly oriented fibers held in place by a net reinforcement, said reinforcement having ultra-violet stabilized bottom netting defining a grid of apertures, and an ultra-violet stabilized cuspated netting, said cuspated netting having a plurality of alternating ridges and troughs extending in substantially parallel relation, said fiber matrix being sandwiched between said bottom netting and said cuspated netting, said bottom netting being secured in spaced array through the fiber matrix in close proximity to said troughs of said cuspated netting, wherein said bottom netting acts as a structural support in retention of said fiber matrix to eliminate fiber loss under high velocity channel flow, said cuspated netting forms a three dimensional structure in conjunction with said fiber matrix for trapping sediment and thatch and expediting natural soil in-filling and root reinforcement, said fiber matrix provides temporary and long term erosion control and mulch accumulation for the channel surface by retaining underlying soil, seed and moisture, said cuspated netting also contains in-filled soil leaves and thatch, ultimately forming a complete three dimensional structure providing a permanent matrix for plant root entanglement and reinforcement.

* * * * *